F. S. INGOLDSBY & J. R. BOWLING.

CAR.

APPLICATION FILED MAR. 6, 1906.

Reissued Jan. 14, 1913.

13,511.

6 SHEETS—SHEET 1.

Witnesses
J. Martin Foshe
Brennan B. West

Inventors
Frank S. Ingoldsby
Joseph R. Bowling
by Bates, Foulds & Hull,
Attorneys.

F. S. INGOLDSBY & J. R. BOWLING.

CAR.

APPLICATION FILED MAR. 6, 1906.

Reissued Jan. 14, 1913.

13,511.

6 SHEETS—SHEET 2.

Witnesses
J. Martinfoke
Brennan Bedell

Inventors
Frank S. Ingoldsby
Joseph R. Bowling
by Bates, Souls & Hull,
Attorneys.

F. S. INGOLDSBY & J. R. BOWLING.

CAR.

APPLICATION FILED MAR. 6, 1906.

Reissued Jan. 14, 1913.

13,511.

6 SHEETS—SHEET 3.

Witnesses
H. Martin Cooke
Brennan & West

Inventors
Frank S. Ingoldsby
Joseph R. Bowling
by Dallas, Fouts & Hull
Attorneys.

F. S. INGOLDSBY & J. R. BOWLING.

CAR.

APPLICATION FILED MAR. 6, 1906.

Reissued Jan. 14, 1913.

13,511.

6 SHEETS—SHEET 4.

Witnesses

J. Murtinfoke

Brennan & West.

Inventors

Frank S. Ingoldsby

Joseph R. Bowling by Bates, Souto & Hull,

Attorneys.

F. S. INGOLDSBY & J. R. BOWLING.

CAR.

APPLICATION FILED MAR. 6, 1906.

Reissued Jan. 14, 1913.

13,511.

6 SHEETS—SHEET 5.

Witnesses
J. Murtin Cooke
Brennan R. West

Inventors
Frank S. Ingoldsby
Joseph R. Bowling
by Baker, Souter & Hull
Attorneys.

F. S. INGOLDSBY & J. R. BOWLING.

CAR.

APPLICATION FILED MAR. 6, 1906.

Reissued Jan. 14, 1913.

13,511.

6 SHEETS—SHEET 6.

Witnesses

J. A. Martinfoke

Brennan B. West.

Inventors

Frank S. Ingoldsby

Joseph R. Bowling by Bates, Souls & Hull,

Attorneys.

UNITED STATES PATENT OFFICE.

FRANK S. INGOLDSBY AND JOSEPH R. BOWLING, OF ST. LOUIS, MISSOURI, ASSIGNORS TO THE INGOLDSBY AUTOMATIC CAR COMPANY, OF ST. LOUIS, MISSOURI, A CORPORATION OF WEST VIRGINIA.

CAR.

13,511. Specification of Reissued Letters Patent. Reissued Jan. 14, 1913.

Original No. 784,265, dated March 7, 1905, Serial No. 185,942. Application for reissue filed March 6, 1906. Serial No. 304,596.

*To all whom it may concern:*

Be it known that we, FRANK S. INGOLDSBY and JOSEPH R. BOWLING, citizens of the United States, residing at St. Louis, in the State of Missouri, have invented a certain new and useful Improvement in Cars, of which the following is a full, clear, and exact description, reference being had to the accompanying drawings.

Our invention relates to cars, and particularly to dumping-cars of the "Ingoldsby" type, and has for its object to improve the mechanism associated with the dumping doors, including the hinging, the door-raising and the automatic disengagement of the door-raising, and to employ with such mechanism an improved construction of floor-bracing, and to simplify the construction of the bearing-plates for the car sides.

The invention may be described generally as consisting of the features of construction embodied in the specification and drawings and set forth in their essential combinations in the claims hereto appended.

Figure 1:
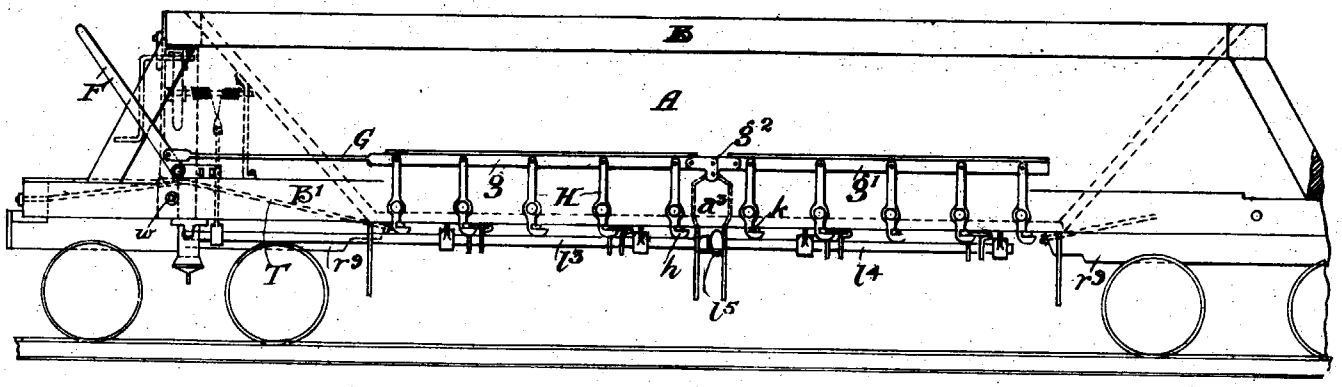
Figure 2:
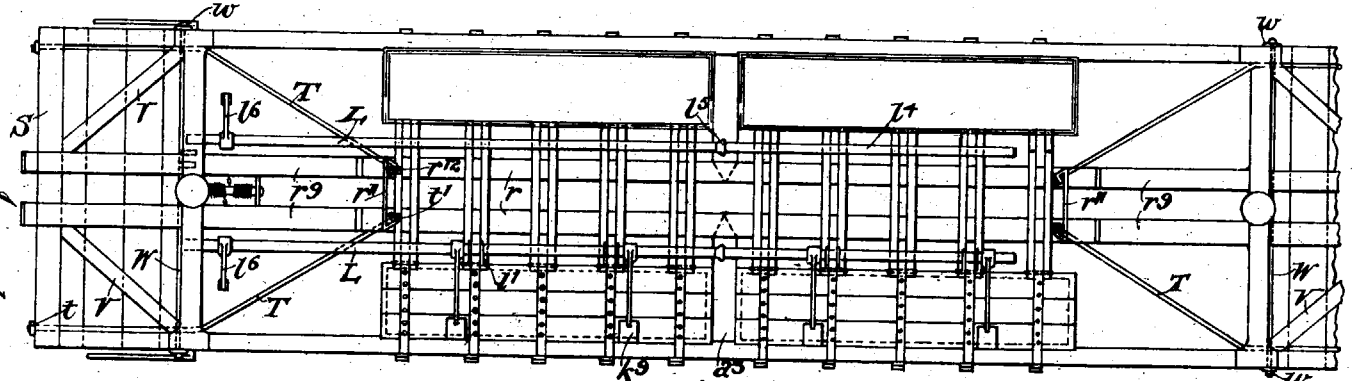
Figure 3:
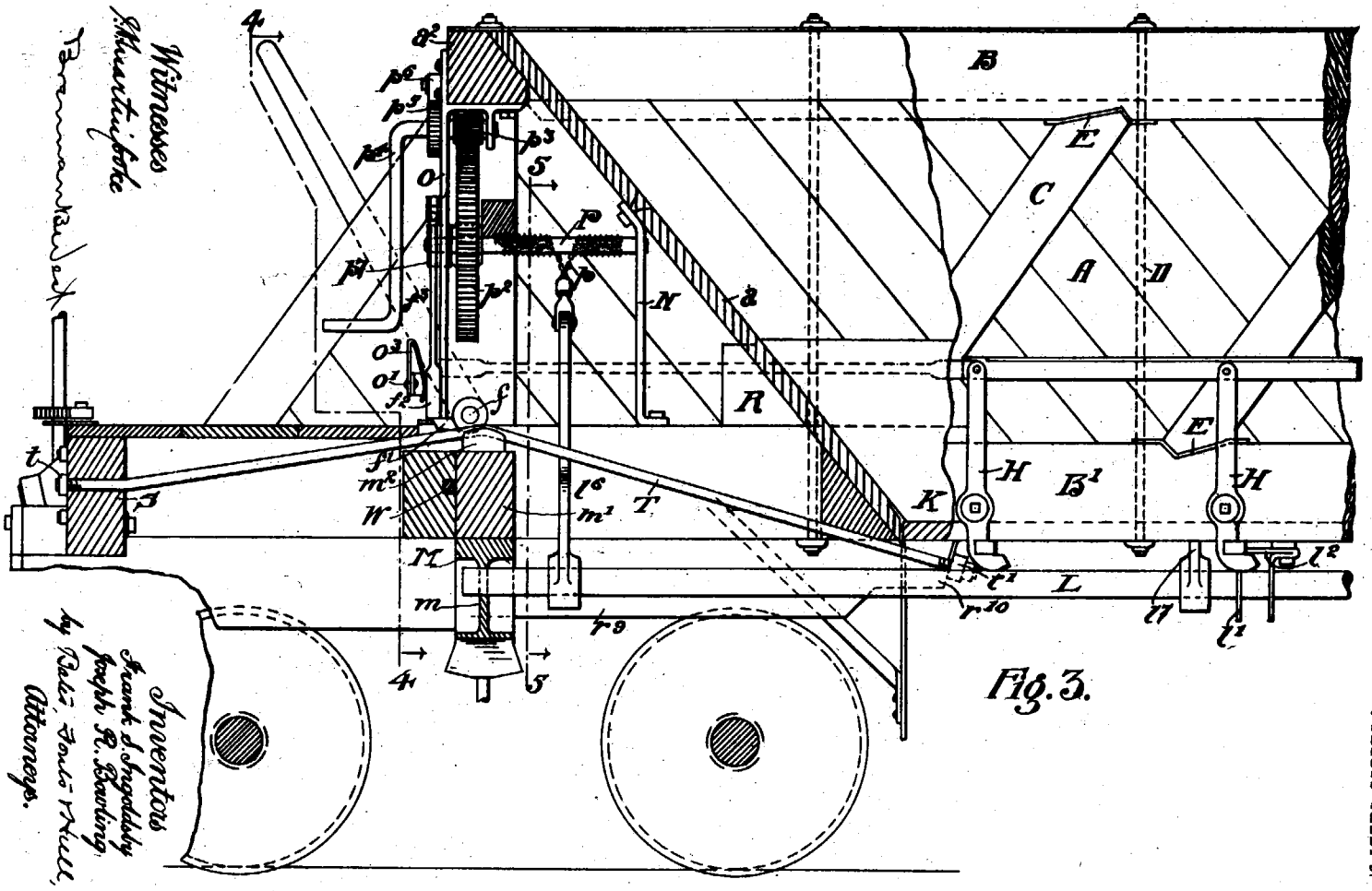
Figure 4:
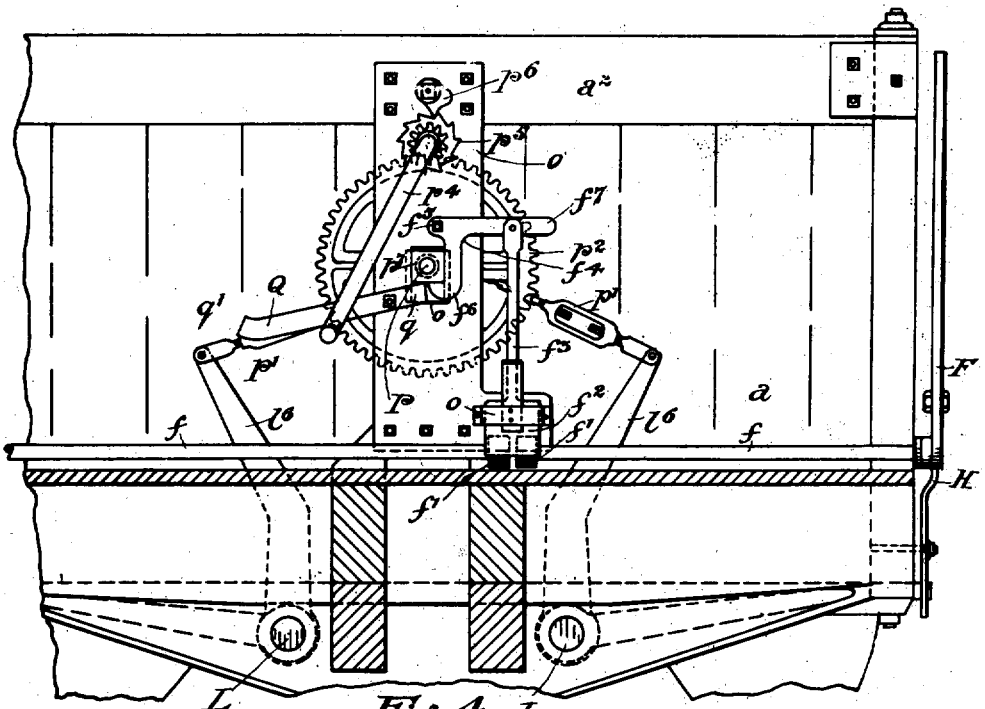
Figure 5:
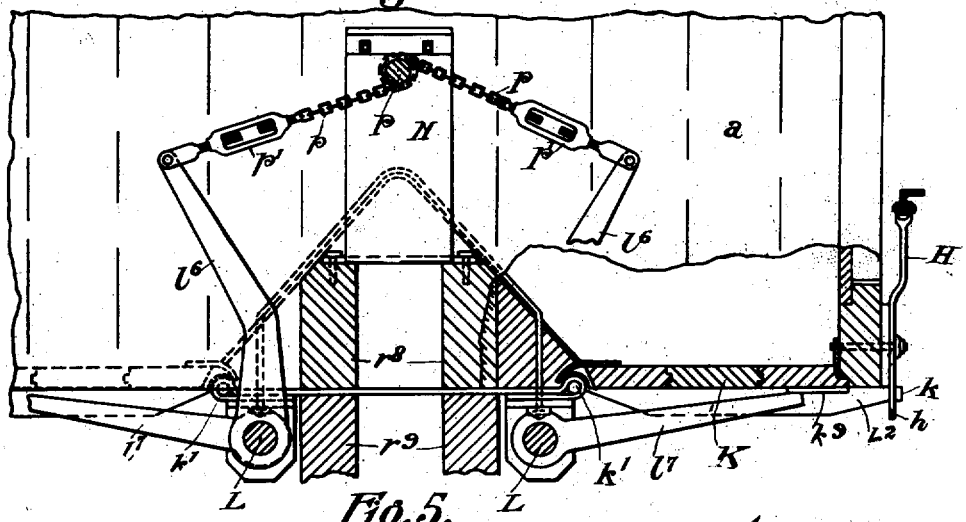
Figure 6:
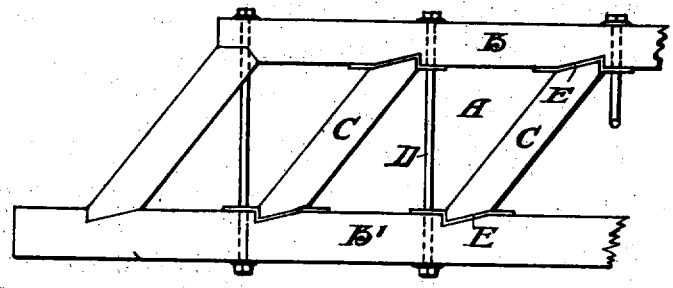
Figure 7:
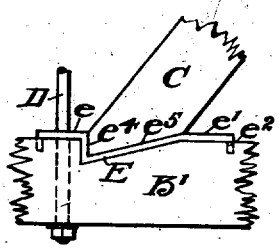
Figure 17:
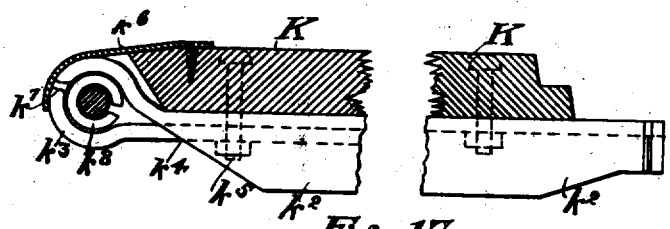
Figure 18:
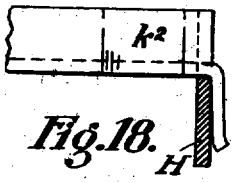
Figure 19:
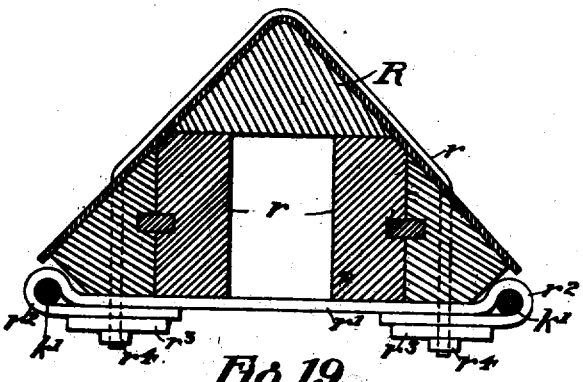
Figure 21:
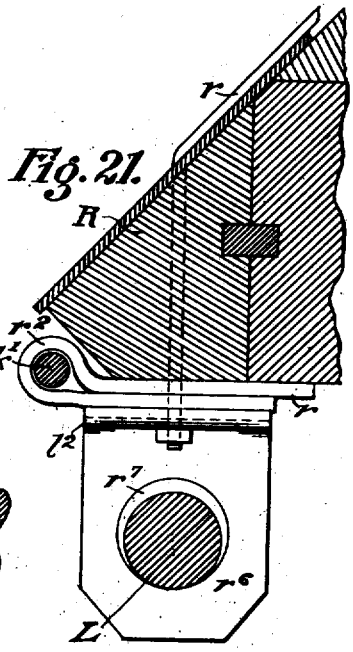
Figure 20:
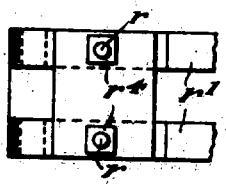
Figure 22:
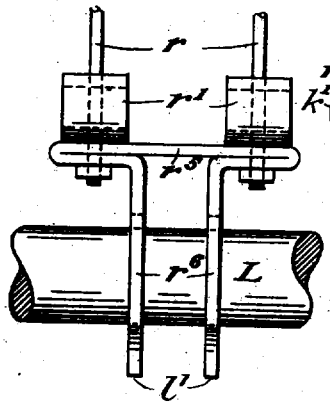

Figure 1 represents the side elevation of a car embodying our invention, the struts and bearing-plates being omitted for clearness of illustration. Fig. 2 represents a bottom plan view of the car shown in Fig. 1, the dumping-doors on one side being omitted. Fig. 3 represents an enlarged view of one of the end portions of the car, the side and the lower and upper chords being broken away near the end to show the construction and arrangement of parts. Figs. 4 and 5 are sectional elevations on the lines 4—4 and 5—5 of Fig. 3. Fig. 6 represents a side elevation of a portion of our car having applied thereto one form of our bearing-plate. Fig. 7 represents an enlarged elevation of such bearing-plate. Figs. 8, 9, 10, 11, 12, 13, 15, and 16, inclusive, represent side elevations of different modifications of our invention, while Fig. 14 represents a plan view of the bearing-plate shown in Fig. 13. Fig. 17 represents a transverse sectional view taken through one of our doors. Fig. 18 represents a detail in plan view of the floor beam employed with such door, the locking lever being shown in section. Fig. 19 represents a transverse sectional elevation of our central longitudinal beam. Fig. 20 represents a detail in bottom plan view showing the door hinging and tying straps carried by the central longitudinal beam. Fig. 21 represents an enlarged sectional detail of our central longitudinal beam, showing the manner of applying thereto the journal plates for the door operating shaft; and Fig. 22 represents a detail in front elevation of such journal plates and surrounding parts.

Describing the parts by letters, A designates the side of a car which may be of any approved construction, that shown being one of the Ingoldsby type. Near the operating end of the car is pivoted the lever F, which is connected by the link G to the door locking levers H, said levers being pivoted to the lower sill or chord B′ and provided with hooks $h$ for engaging the latches $k$ of the doors K. The link G preferably comprises the two sections $g$ and $g'$, united by a breakable connection $g^2$ of the type shown in application Serial No. 51,656 of Frank S. Ingoldsby, filed March 18th, 1901, the object of such connection being to permit of the dumping of one or both doors on the same side of the car by a single operation of the lever F. The dumping doors K are shown as hinged at $k'$ below and at one side of the central beam R, and each extends from the bottom of the inclined floor $a$ to the cross beam $a^3$.

The features thus far described are common to the Ingoldsby type of car and need not be enlarged upon in this connection.

*Door closing and hinging mechanism.*—At a point below the central beam structure and somewhat nearer the center of the car than the hinges of the doors we have located a pair of rocking shafts L. Each rock shaft extends substantially the entire length of the bottom of the car, being carried by the journals $l'$. These journals may be formed of bent metal shapes $l^2$, which are secured to the under side of the longitudinal beam. The number and location of such journals is immaterial so far as our invention is concerned, it being essential only that the rock shaft shall be supported securely and in such manner as to prevent the flexure of the same. The end of the shaft adjacent to the operating end of the car may for further rigidity be supported by the bolster M in any suitable manner, as by journaling the end thereof in the web $m$ of such bolster. As in the case with the door-operating shaft shown in Patent No. 720,031 to F. S. Ingoldsby, the shaft L is preferably made of two portions $l^3$, $l^4$, connected at the car center by a flexible joint $l^5$ of any approved construction, permitting the sagging of the center of the car without interfering with the operation of the shaft to close the doors. The portion $l^4$ of the shaft extends from the center of the car only a sufficient distance to secure proper support for the same, terminating, as shown in Fig. 1, near the inclined end of the car. To the end of the shaft adjacent to the operating end of the car is rigidly secured a lever arm $l^6$. Secured to the shafts L are arms $l^7$ for closing the doors. These arms $l^7$ extend nearly to the free edge of the doors K, being rounded off at the upper surface of their extremities and bearing against rub-plates $k^9$ of any approved construction. If desired, an antifriction-roller may be journaled in the end of each of said arms $l^7$, or such roller may be journaled in the door, so as to form a bearing for the end of the arm $l^7$.

In order to conveniently operate the rock shafts L to close the doors, we employ the following mechanism: Extending from the inclined end $a$ of the car to the central beam structure is a plate N, said plate being secured in any suitable manner to said end and central beam structure. Extending from the cross-cap $a^2$ of the car-body to the central beam structure and suitably secured to such beam structure is the plate O. These plates are provided with journals for the shaft P. Chains $p$, connected to the levers $l^6$, are secured to said shaft. In order to insure the simultaneous closing of the doors on both sides of the car, adjustable connections, as turnbuckles $p'$, are interposed between said chains and the ends of the levers $l^6$, the upper portions of said levers being offset outwardly, as shown, to provide space for the insertion of said turnbuckles between the upper ends thereof and the shaft when the doors are closed, and to give better leverage as the door is closing. By means of a gear wheel $p^2$, rigid with the shaft P, and a pinion $p^3$, meshing with said gear wheel and provided with an operating crank $p^4$, the doors may be raised with a comparatively small expenditure of power. The crank and pinion may be supported in any suitable manner, as between the plate N and the plate O, carried by the end sill $a^2$. The pinion shaft is provided with a ratchet $p^5$, a pawl $p^6$ for said ratchet being pivoted to the plate O.

The mechanism hereinbefore described may be operated to dump the car and to close the doors without the necessity for any additional mechanism. In order, however, to prevent the rotation of the crank $p^4$ at the time when the doors are dropped, we have devised the following construction: The end of the shaft P is carried in a collar or journal box $p^7$, fitting in a slot $o$ in the plate O. A weighted pawl $f^4$, pivoted at $f^5$ on the plate O and having a hook $f^6$ engaging the lower face of the journal box, normally supports this journal box in a position to insure an enmeshing of the gear $p^2$ with the pinion $p^3$. By means of a handle $f^7$ the pawl may be operated to throw the gear $p^7$ out of mesh with the pinion $p^3$ just before the doors are dropped. To provide, however, for the automatic disengagement of said gear and pinion on the dropping of the doors, the levers F F on the sides of the car are rigidly connected to rock shafts $f$ $f$, respectively extending from a side to the central portions of the car and there provided at their ends with suitable projections $f'$ $f'$, adapted to engage the lower extremity of an arm $f^3$, secured to the pawl $f^4$. This arm $f^3$ is loosely pivoted to the arm of the pawl and is preferably provided at its lower end with a weight $f^2$, such weight being of sufficient width to permit the engagement thereof by both projections $f'$. A keeper $o'$ on the plate O is employed to prevent too great displacement of the arm $f^3$, space being provided between the plate O and the portion of the keeper opposite said plate to permit the arm $f^3$ to be moved a sufficient distance from said plate to enable the projections $f'$ to pass under the same when the levers F are operated to lock the doors. In order to insure that the weighted end of the arm $f^3$ shall be in operative relation to the projections $f'$ at the time when it is desired to operate the levers F, a spring $o^3$ is attached to the keeper $o^2$ in such manner as to press the weighted end of the arm toward the plate O and retain such end above the outer ends of the projections $f'$. It will of course be understood that the arrangement and proportions of the parts are such that the gear $p^2$ and pinion $p^3$ are thrown out of mesh by the operation of either lever F slightly in advance of the dropping of the doors. By means of a lever Q, pivoted to the plate O and having an end $q$ engaging the lower face of the journal-box $p^7$, the shaft P may be lifted into position to permit the hook $f^6$ of the pawl $f^4$ to engage such lower face of the journal box, the lever being provided with a handle $q'$ for the purpose of operating the same. It will be noted that the winding shaft P, the chains and arms $l^6$ are all mounted in the idle space beneath the inclined end floor $a$, and thus require no extra room in the designing of the car.

Secured to the under sides of the doors K are the floor beams $k^2$. These beams are of ordinary rolled sections, preferably angle-irons, as shown in Figs. 17 and 18. The horizontal member of the angle iron is bent into an eye at $k^3$ to form a hinge for the door, the end of the horizontal member being bent back upon itself at $k^4$ and being secured to the other part of said member and the door by means of a bolt $k^5$. By this construction the strength of the hinge is materially increased.

Secured to the inner edge of the door and extending over the hinge $k^3$ is the bent plate $k^6$, which we ordinarily employ with our doors and which is shown, described, and claimed in Patent No. 706,662, granted to F. S. Ingoldsby. This plate is secured to the hinge by means of a countersunk rivet $k^7$. In order to provide an antifriction portion for the hinge and at the same time allow ample room for inserting the rivet $k^7$ during the work of construction or repairs, we interpose a short metal sleeve $k^8$, said sleeve fitting said hinge-eye with sufficient closeness to retain it in place during the operation of the door and being further held in position by the strap-irons $r'$ $r'$ described later.

At its outer end the vertical member of the floor beam is extended beyond the horizontal member and is bent in the manner shown in Fig. 18 to provide a beveled surface for engagement with the side of the locking lever H. This lever is itself provided with a beveled surface at the top of the hook portions, as is usual with the levers employed with the Ingoldsby cars.

Pairs of U-shaped bolts $r$ $r$ extend over the longitudinal beam R and through the side members thereof in the same manner as shown in Patent No. 613,279, granted to F. S. Ingoldsby. Instead of employing with these bolts castings for tying across the under side of the central beam, as shown in said patent, we employ two plain strap irons $r'$ $r'$, bent into the form shown in Fig. 19, the eyes $r^2$ forming the bearings for the hinge-pintles and the ends of said straps being bent back upon themselves a sufficient distance to permit the bolts $r$ to pass therethrough, as well as through the main body of the strap, while the outer portions of the straps and the ends thereof are bound together by the plate $r^3$, through which the bolts $r$ also extend and which forms a bearing for the nuts $r^4$, by which said bolts are tightened. This arrangement provides in a simple way and without waste of material for the strength required for that portion of $r'$ which extends outwardly beyond the bolts $r$.

In Figs. 21 and 22 we have shown a form of plate which we employ at the points where it is desired to form a journal for the door-raising shaft L. This plate is a wrought metal bent shape, the central portion $r^5$ of which extends between and beneath the strap irons $r'$, the ends of said plate then being bent inwardly a sufficient distance to receive the U-bolts $r$ and to form bearing surfaces for the nuts thereon and then being bent downwardly to form the vertical depending portions $r^6$, said portions having holes $r^7$ cut therein for the reception of the shaft L.

The employment of forgings and ordinary rolled shapes for the malleable castings heretofore used for the door hinging and shaft journaling members results in a decided gain in economy of construction, while the structural details of such members insure their strength and efficiency of operation.

*Floor bracing construction.*—As an improvement in the method of bracing the end of the floor frame, whereby the said frame may better resist the strains to which it is subjected—as, for instance, when the car is being pulled around sharp curves or is being roughly coupled, as well as to permit of the effective operation of the door-raising mechanism, we have devised the following construction.

To the lower sides of the longitudinal beam members $r^8$ are bolted the extension beams $r^9$, said extension beams reaching from a point below the outer ends of the doors K to the end sills S. The inner ends of these extension beams are inclined, as shown at $r^{10}$, to receive a bearing plate $r^{11}$, which is suitably secured to such ends. A pair of tie rods T extend upwardly from this bearing plate to the outer ends of the beam $m'$ above the bolster M, passing over saddles $m^2$ on said beam. From this point the rods extend parallel with and just inside of the members B′ and through the end sill. The ends of each of these rods are threaded and provided with nuts $t$ $t'$, whereby the tension of the same may be adjusted. As a convenient and economical manner of providing bearings for the nuts on the inner extremities of the tie-rods we bend the ends of the plate $r^{11}$ in the manner shown in Fig. 2, whereby the inclined surfaces $r^{12}$ are formed at substantially right angles to the direction of the tie-rods, and said inclined portions of the plate are reinforced by reason of the extremities of the same bearing against the body of the plate.

The arrangement of the tie rods above described enables us to operate the levers $l^6$, connected to the shafts L, without interference with the tie rods and without unduly shortening said levers.

With the construction of tie rod above described we employ struts V, extending from the junction of the members $r^9$ and the end sill to a point near the bolster. To resist the thrust of these strut members at their ends near the bolsters, we introduce a transverse tie-rod W, having large washers $w$ at each end bearing against the outside of the members B′ at points adjacent to the engagement therewith of the said strut members. This construction will efficiently resist the strains to which the lower framing of the car is subjected when going around curves.

*Bearing-plate construction.*—Heretofore it has been customary to construct the bearings for the ends of the struts of trussed car sides and similar trussed structures of castings and to secure such castings to the chords by means of lugs. An example of this construction of bearings is shown in the patent granted to F. S. Ingoldsby, February 10th, 1903, No. 720,031. We arrange a bearing for such struts that will be cheaper and lighter and more easily constructed than those heretofore used. For this purpose we employ a plate of the proper width and thickness and place the same in a die, wherein it is bent cold to the desired shape at one operation, thus doing away with the expense and delay incident to making casting patterns and annealing, as would be the case were malleable iron or steel castings employed.

A represents a portion of the trussed side of the said car, said side, as hereinbefore described, being provided with upper and lower chords B B′, inclined struts C, and tie rods D. At either or both ends of each of the struts C and interposed between the same and the adjacent chord is the bearing plate E. This plate in all of the modifications herein disclosed is provided with the flat or horizontal end portions $e$ $e'$, adapted to be secured to the appropriate chord, as by means of screws or nails $e^8$. As further shown, these end portions may be provided with portions $e^2$ of less width than the main body of the plate, which portions may be bent to engage corresponding recesses in the chords, thereby enabling the plate to be firmly secured against displacement by the thrust of the strut. Adjacent to one of the ends of said plate an opening $e^3$ is formed, through which the tie rod D extends, said tie rod being secured to the chord, as by the nut $d$ and washer $d'$ on the lower side of the chord. Intermediate of the flat end portions the plate is bent to form a bearing surface or surfaces for an end of the strut C. In Fig. 7 the plate is shown as bent abruptly at substantially right angles to the portion $e$ to form the wall $e^4$. From the end of said wall $e^4$ the plate inclines gradually to its junction with the flat portion $e'$. The two walls $e^4$ $e^5$ form the bearing surfaces for the strut C, the chord B or B′ being recessed to receive the portions $e^4$ $e^5$. The inclination of the wall $e^4$ at substantially right angles to the chord gives an abutting surface for the strut C, securely anchoring the end of said strut, with a corresponding small depth of recess in the plate.

Figure 8:
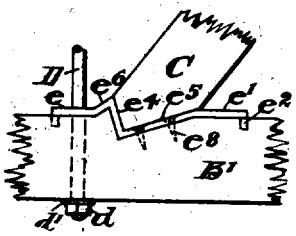

In the modification shown in Fig. 8, the plate is first bent upwardly, as shown at $e^6$, then downwardly at an obtuse angle to the direction of the portion $e$, then upwardly on a gradual incline to the portion $e'$, the sides $e^4$ $e^5$ forming a reëntrant angle, as is the case with the modification shown in Fig. 7.

Figure 9:
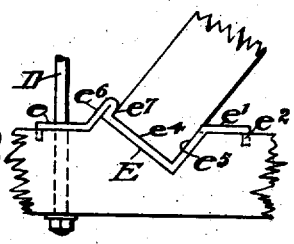

In Fig. 9 the plate is bent upwardly, as is the case with the modification shown in Fig. 8, and is then abruptly bent or crimped at $e^7$, the portion $e^7$ extending downwardly in contact with the portion $e^6$ for a short distance. The plate is then bent at substantially right angles to the portion $e^7$, the portion $e^4$ thus formed being of a length to accommodate the end of the strut. The plate is then bent upwardly at right angles at $e^5$, said portion $e^5$ extending to the flat portion $e'$. This forms a secure seat or anchorage for the end of the strut, and the reëntrant angle formed between the portions $e^4$ and $e^5$ and enables the plate to be firmly secured to the chord B′.

Figure 10:
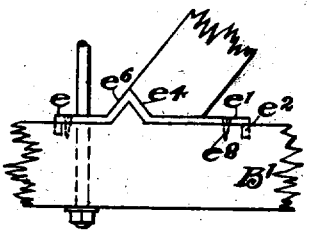
Figure 13:
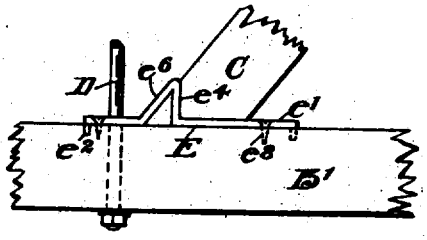
Figure 14:
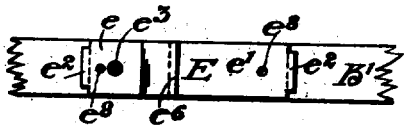

In the modifications shown in Figs. 10 and 13 the plate is not bent to a sufficient depth to form a reëntrant angle when viewed from above, as is the case with the remaining modifications; but the bent portions $e^6$ $e^4$ are entirely above the plane of the portions $e$ $e'$. In Fig. 13 the wall $e^4$ is at substantially right angles to the end portions $e$ $e'$, while in Fig. 10 it forms an obtuse angle with the plane of said portions. In both of these modifications the portion corresponding to the wall $e^5$ in the preceding figures may be considered as an extension of the wall $e'$ in the plane of said wall.

Figure 11:
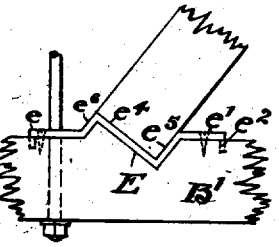

The plate shown in Fig. 11 is similar to that shown in Fig. 9, except that it is not bent or crimped at $e^7$ to form a retaining wall for the strut.

Figure 12:
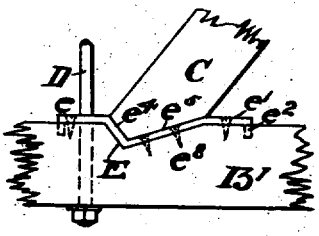

The plate shown in Fig. 12 is similar to that shown in Figs. 7 and 8, differing from the former figure in that the wall $e^4$ forms an obtuse angle with the portion $e$ and differing from the plate shown in Fig. 8 in that the portion $e^6$ is omitted.

Figure 15:
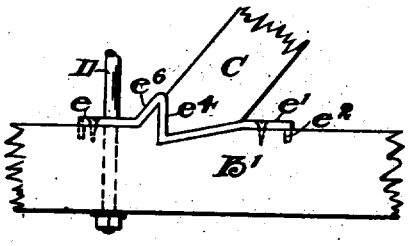

The plate shown in Fig. 15 resembles that shown in Fig. 8, the wall $e^6$ being somewhat higher than that shown in the former figure and the wall $e^4$ being at substantially right angles to the direction of the portions $e$ $e'$ instead of forming an obtuse angle therewith, as in the preceding figure.

Figure 16:
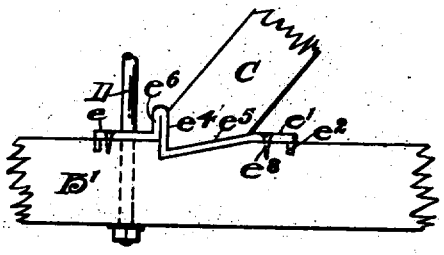

In Fig. 16 the wall $e^6$ is at substantially right angles to the portion $e$, and the wall $e^4$, as in the case of Fig. 15, is at right angles to the plane of such portion $e$, crimping the plate and bringing the walls $e^4$ and $e^6$ into contact with each other.

In all the modifications of our invention herein disclosed there are two portions $e$ $e'$ in the same plane and intermediate of said portions an inclined portion $e^4$, against which the end of the strut abuts.

While we have employed the terms "upwardly" and "downwardly" with reference to the directions of bending the plate relatively to the portions $e$ $e'$, such terms are employed only for convenience of description, it being evident that if the plate be applied to the upper end of a strut the said terms will be reversed.

We claim:

1. In a dumping car, the combination of oppositely-arranged dumping-doors, a rock-shaft for each of said doors, said shaft having rigid therewith one or more arms engaging its door, and common operating means for both of said shafts, substantially as described.

2. In a dumping car, the combination of dumping-doors, raising mechanism comprising a rock shaft and rock arm for each of said doors, a common operating shaft, and a flexible connection between each of said raising mechanisms and said operating-shaft, substantially as described.

3. In a dumping car, the combination of dumping-doors, a rock-shaft for each of said doors, a lever rigid on said shaft for engaging and operating the same, an operating-shaft, and a flexible connection between each of said levers and the operating-shaft, whereby the doors may be closed in unison, substantially as described.

4. In a dumping car, in combination with the bottom of the car, a central longitudinal beam, a hinged door extending between the beam and the side of the car, a rock-shaft, an arm extending from said rock-shaft against the bottom of said door near the free edge of the same, a lever rigid with said rock-shaft, an operating-shaft and a chain or similar flexible connection between said rock-shaft lever and said operating-shaft, substantially as described.

5. In a dumping car, in combination with the bottom of the car, a door hinged to the bottom of said car, means for closing said door consisting of rock-shafts having a rigid arm engaging said door, an operating member and a flexible connection between said operating member and said shafts, substantially as described.

6. In a dumping car, in combination with the bottom of the car, a central longitudinal beam, doors hinged at opposite sides of said beam, a rock-shaft extending longitudinally of the door and supported by the central beam, an arm or arms rigid with said rock-shaft and engaging the door, a lever rigid with said rock shaft at an angle with said arm, a shaft, and a connection between said shaft and the lever on the rock-shaft, substantially as described.

7. In a dumping car, the combination of oppositely arranged dumping doors, a rock shaft for each of said doors, said shaft having rigid therewith one or more arms engaging its door, means carried by said shaft for rocking the same, a common operating means for both of said shafts and a connection between the same and the rocking means carried by said rock shaft whereby the doors may be closed in unison, substantially as described.

8. In a dumping car, the combination of oppositely arranged dumping doors, a rock shaft for each of said doors, said rock shaft having rigid therewith one or more arms engaging its door near the free edge thereof, a lever rigid on said shaft for operating the same, an operating shaft, and a flexible connection between each of said levers and the operating shaft, whereby the doors may be closed in unison, substantially as described.

9. In a dumping car, the combination of oppositely arranged dumping doors, a rock shaft for each of said doors, said shaft having rigid therewith one or more arms engaging its door near the free edge thereof, a lever rigid on said shaft for operating the same, an operating shaft, a flexible connection between each of said levers and the operating shaft, and means for adjusting the length of each of said connections whereby the doors may be closed in unison, substantially as described.

10. In a dumping car, in combination with the bottom of the car, a central longitudinal beam, a door hinged at the bottom of the car and extending between the beam and the side of the car, a rock shaft below said beam, an arm extending from said rock shaft against the bottom of said door near the free edge of the same, a lever rigid with said rock shaft, a centrally arranged operating shaft above said rock shaft, and a chain or similar flexible connection between said rock shaft lever and said operating shaft, substantially as described.

11. In a dumping car, in combination with the bottom of the car, a door hinged to the bottom of said car, means for closing said door consisting of a rock shaft extending longitudinally of said door, said shaft having a rigid arm engaging said door near the free edge thereof, a lever rigid with said shaft at substantially right angles with said arm, an operating shaft above said rock shaft and on the side of the same opposite said arm, and a flexible connection between said operating shaft and said lever, substantially as described.

12. In a dumping car, in combination with the bottom of said car, a central lngitudinal beam, a door hinged below and at one side of said beam, a rock shaft extending longitudinally of the door and journaled to the central beam below the hinged portion of the door, an arm or arms rigid with said rock shaft and engaging the door near the free edge thereof, a lever rigid with said rock shaft at an angle with said arm or arms, a shaft above said rock shaft, and a connection between said shaft and the lever on the rock shaft, substantially as described.

13. In a dumping car, in combination, with the inclined end and bottom of said car, a central longitudinal beam, doors hinged to said central beam adapted to extend between said central beam and the side of the car, individual closing mechanism for said doors, a common rotatable longitudinal operating shaft under the inclined end of the car, connections between it and said mechanisms, and a crank rotating in a vertical transverse plane at the end of the car for rotating said shaft, substantially as described.

14. In a dumping car, in combination with the inclined end and bottom of said car, doors for said bottom which are horizontal when closed, shafts located below the floor having means thereon for swinging said doors upward into horizontal position, and a common operating mechanism comprising a rotatable winding shaft and flexible connections under the inclined end of said car, substantially as described.

15. In a dumping car, in combination with the inclined end and bottom of said car, a door for said bottom of the car, a shaft extending longitudinally of the car and having an arm thereon for engaging and closing said door, said shaft being extended at one end beneath the inclined end of the car, an operating shaft under the inclined end of the car, and a flexible connection between said shafts, substantially as described.

16. In a dumping car, in combination with the inclined end and bottom of the car, a central longitudinal beam, a rock shaft below said beam, a door extending between said central beam and the side of the car and closing against such side, an arm rigid with said rock shaft and extending from the same adjacent to the free edge of the door, a lever rigid with said rock shaft under the inclined end of the car, a centrally located operating shaft under the inclined end of the car, and a flexible connection between said shaft and the rock shaft lever, substantially as described.

17. The combination of dumping doors, common raising mechanism therefor, individual releasing mechanism, and means whereby either release disengages the raising mechanism, substantially as described.

18. The combination of a pair of dumping doors, a pair of raising rock-shafts therefor, a common winding mechanism having gearing and a flexible connection with said rock shafts and individual releasing mechanisms for the doors each of which mechanisms may disengage such gearing.

19. In a dump car, the combination of a dumping door, means for closing the door, means for holding the door closed, means for returning the door-closing means to initial position without operating the door, and means connected with the holding means for releasing the door-closing means, substantially as described.

20. In a dump car, the combination of a dumping door, gear mechanism for operating such door, means for releasing a portion of said mechanism to permit it to move independently of the door, means for connecting such gear mechanism with the door while allowing freedom of movement between the door and the gear nearest to it in the chain of mechanism, and means for supporting the swinging side of the door in closed position independently of the gear mechanism, substantially as described.

21. In a dump car, the combination of a dumping door, gear mechanism including meshing gears for operating such door releasable from the door between the door and first gear and having a part capable of movement into releasing position while the door is stationary in its closed position, means for supporting the swinging side of the door in closed position during the movement of such gear mechanism to releasing position, and means for releasing the swinging side of the door from such supporting mechanism, substantially as described.

22. In a dump car, the combination of a dumping door, gear mechanism for operating such door movable in one direction to close the door and in the opposite direction to releasing position while the door is stationary in closed position, means for connecting such gear mechanism with the door, and mechanism movable into and out of engagement with the door for supporting the swinging side thereof while the gear mechanism is in releasing positions, substantially as described.

23. In a dump car, the combination of a car frame, dumping doors pivotally mounted in the car frame, door operating mechanism mounted in the car frame entirely below the level of the doors when in their closed position and independently of the hinging thereof and having rock arms bearing against the doors at points intermediate their longitudinal centers and outer swinging edges, and means for operating such mechanism and thereby the doors, substantially as described.

24. In a dumping car, in combination with the inclined end and bottom of said car, a door for said bottom of the car, a shaft extending longitudinally of the car and provided with means engaging said door to close the same, the end of said shaft being extended beneath the inclined end of the car, plates secured to the inclined end and cross-cap of the body of the car, an operating shaft journaled in said plates, and a connection between the operating shaft and the first mentioned shaft, substantially as described.

25. In a dumping car, in combination with the bottom of said car, a door hinged to the bottom of said car, mechanism for closing said door, means for locking and unlocking said door, a lever for operating said locking and unlocking means, and means carried by the lever for throwing part of the door raising mechanism out of operation when the lever is operated to drop the door, substantially as described.

26. In a dumping car, in combination with the bottom of said car, a door hinged to the bottom of said car, gear-provided means for closing said door, a crank and pinion for operating said last-mentioned means, means for locking and unlocking said door, a lever for actuating said locking and unlocking means, a rock shaft to which said lever is fulcrumed, and means carried by said rock shaft for throwing the pinion and gear-provided means out of mesh when the lever is operated in a direction to drop the doors, substantially as described.

27. In a dumping car, in combination with the bottom thereof, doors hinged to the bottom, means for closing said doors, said means consisting of a shaft having a gear thereon, a crank and pinion for operating said gear, means for holding said gear and pinion in mesh, said means consisting of a pawl engaging the under portion of the operating shaft, an arm depending from said pawl, means for locking and unlocking the doors, a lever for operating said locking and unlocking means, and means, operated by the lever, engaging said arm to trip the pawl when the lever is operated in a direction to open the door, substantially as described.

28. In a dumping car, in combination with the bottom thereof, a door for said bottom, means for closing said door, said means comprising enmeshing gears, one of said gears having an operating handle, means for holding said gears in mesh, said means comprising a weighted pawl having an arm connected thereto, means for locking and unlocking said door, and means operated by said locking and unlocking means and engaging said arm to trip the pawl and throw the gears out of mesh when the locking and unlocking means are operated to drop the doors, substantially as described.

29. In a dumping car, in combination with the bottom of said car, a door for the bottom of said car, means for closing said door, said means comprising enmeshing gears, and means, including a weighted arm, for holding said gears in mesh, means for locking and unlocking said door, a lever for operating said last-mentioned means, a rock shaft to which said lever is fulcrumed, said rock shaft being provided with a device for engaging said weighted arm to trip the pawl and throw the door raising gears out of mesh when the lever is operated in a direction to drop the door, substantially as described.

30. In a dumping car, in combination with the bottom of the car, a door hinged to the same, means for closing said door, said means comprising enmeshing gears, an arm rigid with one of said gears, a journal box carried by the other of said gears, a pawl pivoted above said box and having a hook engaging the same to hold the gears in mesh, an arm secured to said pawl, a keeper for the outer portion of said arm, said keeper constructed to permit lateral movement of said arm, a spring in said keeper pressing against the outer portion of said arm, means for locking and unlocking said doors, a lever for operating said means, and a rock shaft to which said lever is rigidly fulcrumed, said rock shaft being provided with a projection engaging the outer end of said arm, substantially as described.

31. In a dumping car, in combination with the sides and bottom of the car, a central longitudinal beam, doors hinged to the opposite sides of said beam and extending to said sides, means for raising said doors, said means comprising a centrally-located operating shaft having a gear thereon and a gear having a crank-arm rigid therewith meshing with the first-mentioned gear, means comprising a weighted arm for holding said gears in mesh with each other, means carried by each of said sides for locking and unlocking the doors, a lever on each side for operating such locking and unlocking means, a transverse rock shaft to which each of said levers is fulcrumed, each of said shafts having at its inner end a projection for engaging the weighted arm to trip the pawl and throw the gears out of mesh at the time when either of said levers is operated in a direction to unlock its door, substantially as described.

32. The combination with a car, of a door hinged to said car, a reinforcing angle-iron beam having one flange secured to said door, said flange being extended to form a hinge-eye and the other flange of said angle-iron being extended beyond the free edge of the door to engage the door-locking means, substantially as described.

33. The combination with a car, of a door for said car, of a reinforcing angle-iron beam for said door having one flange secured to the beam of the door, said flange being extended beyond the other and being bent to form a hinge-eye and then extended back upon itself, and a bolt passing through the end and body portion of said flange and securing the same to the door, substantially as described.

34. In a car, in combination with the side and bottom thereof, a central longitudinal beam provided with means at its lower edge for pivoting a door thereto, a reinforcing angle-iron beam having one of its flanges secured to the bottom of said door, said flange being extended beyond the other flange and bent to form a hinge-eye, a sleeve within said eye, and a pintle extending through said sleeve and through members secured to the beam, substantially as described.

35. In a car, in combination with the bottom thereof, a central longitudinal beam, said beam having at its side an overhanging portion, means secured to said beam and extending beneath said overhanging portion for pivoting said door, a beam secured to the lower side of the door, said beam being bent upon itself to form a hinge-eye for the door, a plate secured to the upper surface of the door and extending over said eye, and means for securing together said eye and plate, substantially as described.

36. In a car, in combination with the side and bottom thereof, a door hinged near the central portion of the bottom and extending to the side, an angle-iron beam having one flange secured to the beam of the said door, the other flange extending beyond the free edge of the door beyond the first flange and bent to form a beveled surface, a pivoted locking lever having a hook engaging the projecting end of the beam and bearing against the beveled portion thereof, substantially as described.

37. In a car, in combination with the side and bottom thereof, a central longitudinal beam, a pair of bolts having their body portions extending over said beam and their extremities extending through the sides of said beam, a pair of straps extending across the under side of said beam in line with said bolts, a plate extending across said straps, said straps and said plate having openings therethrough for the passage of the bolts, nuts on the ends of said bolts, said nuts bearing against said plate, a door hinged to said straps and extending to the side of the car, and means carried by the side of the car for locking the door in a closed position against the lower edge thereof, substantially as described.

38. In a car, in combination with the sides and bottom thereof, a central longitudinal beam, a pair of bolts extending through the sides of said beam, a pair of straps extending across said beam against the lower surface thereof, a plate on each side of said beam extending beneath both of said straps, said plates and straps having openings therethrough for the passage of the bolts, nuts for securing said bolts to said plates, doors pivoted to said straps and extending between the bottom and the sides of the car, and means carried by the side of the car for locking said doors closed thereagainst, substantially as described.

39. A car having a bottom and sides, a central longitudinal beam, a door extending between said bottom and said sides, and means for hinging said door to said bottom, said means comprising a strap-plate extending across the underside of said beam the end of said strap plate being bent to form an eye and then being turned back upon itself, a bolt extending through said beam and through both members of the strap plate to secure the same in position beneath the beam, the door being provided with a hinge-eye, and a pintle extending through said hinge-eye and through the eye formed in the strap, substantially as described.

40. In a car, in combination with a beam, a door, means for pivoting said door to said beam, said means comprising a pair of strap plates secured to the under side of said beam, said plates being bent to form hinge-eyes below and at one side of the beam, the ends of said strap plates being extended beneath the body portions thereof, a plate extending longitudinally of the beam beneath said strap-plates, means for securing said plates to the bottom of the beam, a hinge-eye carried by the door, and extending between the two eyes formed in the strap-plates, and a hinge-pintle extending through all of said eyes, substantially as described.

41. In a car, in combination with the bottom thereof, a longitudinal beam, a door hinged to said beam, a shaft for closing said door, and a bearing carried by said beam for said shaft, said bearing consisting of a plate secured to the bottom and having a pair of downward extensions having journals therein for said shaft, substantially as described.

42. In a car, the combination of a beam, a pair of straps extending beneath said beam and provided with eyes adjacent to the lower edge of the beam, a bent metal shape extending from one of said straps to the other and beneath the same and having a depending portion, bolts extending through said beam and through said straps and portions of the bent metal shape to secure the same to the beam, a door having hinge-eyes coöperating with the eyes in the straps, and an operating shaft for closing said door, said shaft being journaled in the downwardly extended portion of the bent metal shape, substantially as described.

43. In a car, the combination of a beam, a pair of straps extending beneath said beam and provided with eyes adjacent to the lower edge of the beam, a bent metal shape extending from one of said straps to the other and beneath the same, said shape consisting of an intermediate body portion extending from one of said straps to the other and beneath the same, the end portions of said shape being bent toward each other beneath said straps, then downwardly to form depending leg portions, bolts extending through said beam, straps and adjacent portions of the bent metal shape, a door having a hinge-eye coöperating with the eyes in the straps to form a hinge, and a shaft for operating said door, said shaft being journaled in the depending portions of said shape, substantially as described.

44. In a dumping car, in combination with the bottom of said car, a bolster, a side member, doors hinged to said bottom, a shaft journaled near the center of said bottom for elevating the doors, the end of said shaft extending to the bolster, an operating lever rigid with said shaft near the extremity thereof, and a tie-rod having one end secured near the longitudinal axis of the bottom of the car and between said bolster and the center of the car, said tie-rod extending to a point adjacent to the junction of the bolster and side member of the car, substantially as described.

45. In a car, in combination with the bottom thereof, a bolster, a side member, an end sill, a door hinged to said bottom and extending to a point between the transverse axis of the car and the bolster, a longitudinal shaft for closing said door, said shaft being journaled near the center of the car and having one extremity extending as far as the bolster, a lever rigid with said shaft near said extremity, a tie-rod having one end secured at a point near the outer end of said door, said tie-rod extending in proximity to the side member at the junction of the bolster therewith and from there to the end sill of the car, substantially as described.

46. In a car, the combination with a central longitudinal beam, a bolster, an end sill, a strap on the under side of the longitudinal beam having a suitable bearing, and a tie-rod extending upward from said strap to the side of the car at a point above the junction therewith of the bolster and from said point parallel with said side through the end sill, substantially as described.

47. In a car, the combination, with the end sill and the bolster thereof, of a pair of tie-rods having their outer extremities extending through the end sill near the outer ends thereof, said rods extending upwardly and parallel with the sides of the car to a point above the bolster and thence extending inwardly and downwardly to a point adjacent to the center of the car, substantially as described.

48. In a car, the combination, with a longitudinal central member, a side member, a bolster, and an end sill, of a tie-rod extending from the end sill near the outer end thereof parallel with the side member to a point in line with the junction of the bolster and side member, thence inwardly to the central longitudinal member, substantially as described.

49. In a car, the combination, with a central longitudinal member, a bolster, a side member, and an end sill, of a tie-rod extending from the outer portion of said end sill to a point near the junction of said bolster and side member, thence inwardly to said longitudinal member, and a strut extending from the junction of the longitudinal member and the end sill to a point adjacent to the junction of the bolster and the side member, substantially as described.

50. In a car, the combination of a central longitudinal beam, a bolster, an end sill, a strap on the under side of the longitudinal beam having an angular bearing-surface formed thereon, a tie-rod extending from the end sill above the bolster and through the bearing-surface of said strap, and a nut on the end of said tie-rod for adjusting the tension of the same, substantially as described.

51. In a car, the combination of a central longitudinal beam, a bolster, an end sill, a side member, a tie-rod extending from the end sill near one end thereof upwardly and parallel with said member to a point above the bolster then downwardly and inwardly to the lower portion of said longitudinal beam, substantially as described.

52. In a car, the combination of a central longitudinal beam, a bolster, an end sill, side members, a pair of tie-rods each extending from a point adjacent to the outer end of the end sill parallel with a side member to a point above the bolster, thence downwardly and inwardly to the bottom of said longitudinal beam, a strap extending across said longitudinal beam having openings therethrough for the passage of said tie-rods, and means on the ends of said tie-rods for adjusting the tension thereof, substantially as described.

53. In a car, the combination of the central longitudinal beam, of an end sill, extension beams secured to the lower side of said longitudinal beam having their inner ends beveled or inclined, a strap secured to and extending across said beveled ends, tie-rods extending from the end sill through said strap, and means for adjusting the tension of said rods, substantially as described.

54. The combination with a trussed car side, of a bearing-plate having end portions in the same plane, means for securing the same to a chord of the side, said plate having two intermediate portions bent from the end portions and meeting at a common point, and a strut forming a portion of the car side and bearing at its end on both of said intermediate portions, substantially as described.

55. In a car side, the combination of an upper and a lower chord, of a bearing plate, said bearing plate being provided with horizontal end portions and means for securing each of said end portions to a chord, and with two portions inclined with respect to said end portions and meeting at a common point, said inclined portions both forming bearing surfaces for an end of a single strut, substantially as described.

56. In a car side, the combination of an upper and lower chord, an inclined strut between them, a bearing plate for one end of said strut lying partially within a recess in one of the chords and partially projecting beyond the strut-face of such chord toward the other chord, substantially as described.

57. The combination of a door, means for closing the same, mechanism for operating the closing means, means for locking and unlocking said door, a lever for actuating said locking and unlocking means, a rock shaft to which said lever is fulcrumed, and means carried by said rock shaft for throwing the operating mechanism out of engagement when a lever is operated in a direction to trip the door, substantially as described.

58. In a dump car, the combination of a car frame, dumping doors pivotally mounted thereon, door-operating rock shafts parallel with the pivots, and arms mounted on the rock shafts below the level of the doors when in their closed position and free from the doors, said arms being adapted to engage the doors between their hinged edges and swinging edges and means for operating the rock shafts, and other means for locking the doors at their swinging edges.

59. In a dump car, the combination of a central longitudinal supporting member, dumping doors hinged thereto and adapted to be substantially horizontal when closed or to swing downwardly at their outer edges, a pair of door-raising mechanisms supported by the central member and free from the doors, and common operating means flexibly connected with both of said mechanisms.

FRANK S. INGOLDSBY.
JOSEPH R. BOWLING.

Witnesses:
CHAS. M. MEYER,
THELMA KNUDSON.